United States Patent
Solantie et al.

(10) Patent No.: US 9,352,292 B2
(45) Date of Patent: May 31, 2016

(54) METHOD AND ARRANGEMENT FOR FEEDING HEAT-SENSITIVE MATERIALS TO FIXED-BED REACTORS

(75) Inventors: Juha Solantie, Helsinki (FI); Kari J. Koivisto, Porvoo (FI)

(73) Assignee: NESTE OYJ, Espoo (FI)

( * ) Notice: Subject to any disclaimer, the term of this patent is extended or adjusted under 35 U.S.C. 154(b) by 270 days.

(21) Appl. No.: 13/350,578

(22) Filed: Jan. 13, 2012

(65) Prior Publication Data

US 2012/0184792 A1 Jul. 19, 2012

Related U.S. Application Data

(60) Provisional application No. 61/433,884, filed on Jan. 18, 2011.

(30) Foreign Application Priority Data

Jan. 18, 2011 (EP) .................................... 11151226

(51) Int. Cl.
| | |
|---|---|
| *B01J 8/04* | (2006.01) |
| *C10G 49/00* | (2006.01) |
| *C10G 3/00* | (2006.01) |

(52) U.S. Cl.
CPC ................ *B01J 8/0492* (2013.01); *C10G 3/47* (2013.01); *C10G 49/002* (2013.01);
(Continued)

(58) Field of Classification Search
CPC .............. B01J 4/00; B01J 4/001; B01J 4/008; B01J 8/00; B01J 8/003; B01J 8/004; B01J 8/02; B01J 8/0242; B01J 8/025; B01J 8/0278; B01J 8/04; B01J 8/0446; B01J 8/0449; B01J 19/00; B01J 19/0006; B01J 19/0013; B01J 19/002; B01J 19/26; C10G 3/00; C10G 3/42; C10G 3/44; C10G 3/45; C10G 3/46; C10G 3/47; C10G 3/50; C07C 1/20
USPC ................................... 585/240, 733; 422/220
See application file for complete search history.

(56) References Cited

U.S. PATENT DOCUMENTS

| 4,808,350 A | 2/1989 | Robbins et al. |
| 7,803,334 B1 | 9/2010 | Hoehn et al. |

(Continued)

FOREIGN PATENT DOCUMENTS

| EP | 0 306 164 A1 | 3/1989 |
| EP | 1 477 221 A1 | 11/2004 |

(Continued)

OTHER PUBLICATIONS

Perry, R., Perry's Chemical Engineers' Handbook, 1997, McGraw-Hill, Seventh Edition, pp. 23-40 and 23-53.*

(Continued)

*Primary Examiner* — In Suk Bullock
*Assistant Examiner* — Philip Louie
(74) *Attorney, Agent, or Firm* — Birch, Stewart, Kolasch & Birch, LLP

(57) ABSTRACT

The invention relates to an arrangement for feeding heat-sensitive feedstock to a fixed-bed reactor system comprising means for product recycle and a fixed-bed reactor system comprising a fixed-bed reactor comprising at least one reaction zone having at least one catalyst bed and said reaction zone comprising a cold feed distributor arranged on top of each catalyst bed and a conventional distributor arranged above each cold feed distributor. Also a method is provided for feeding heat-sensitive feedstock to a fixed-bed reactor system wherein said fixed-bed reactor system comprises means for product recycle and a fixed-bed reactor comprising at least one reaction zone having at least one catalyst bed and said reaction zone comprising a cold feed distributor arranged on top of each catalyst bed and a conventional distributor arranged above each cold feed distributor.

17 Claims, 3 Drawing Sheets

(52) U.S. Cl.
CPC ............... *B01J 2208/00283* (2013.01); *B01J 2219/00247* (2013.01); *C10G 2300/104* (2013.01); *C10G 2300/1011* (2013.01); *C10G 2300/1044* (2013.01); *C10G 2300/1081* (2013.01); *C10G 2300/4031* (2013.01); *C10G 2300/4037* (2013.01); *C10G 2300/4081* (2013.01); *C10G 2300/802* (2013.01); *Y02P 30/20* (2015.11)

(56) References Cited

U.S. PATENT DOCUMENTS

| | | | |
|---|---|---|---|
| 2007/0010682 A1* | 1/2007 | Myllyoja et al. | 554/174 |
| 2007/0144352 A1 | 6/2007 | Boyer et al. | |
| 2010/0242349 A1* | 9/2010 | Abe et al. | 44/398 |

FOREIGN PATENT DOCUMENTS

| | | |
|---|---|---|
| EP | 2226375 A1 | 9/2010 |
| WO | WO-2005/047216 A1 | 5/2005 |
| WO | WO-2007/003709 A1 | 1/2007 |
| WO | WO-2007/124328 A2 | 11/2007 |
| WO | WO-2008/155399 A1 | 12/2008 |

OTHER PUBLICATIONS

International Search Report issued in corresponding application PCT/FI2012/050035 on Jun. 5, 2012.

EPO Search Report issued on Jun. 6, 2011 in corresponding European Application No. 11151226.5.

* cited by examiner

METHOD AND ARRANGEMENT FOR FEEDING HEAT-SENSITIVE MATERIALS TO FIXED-BED REACTORS

This Nonprovisional application claims priority under 35 U.S.C. §119(a) on European Patent Application No. 11151226.5 filed on Jan. 18, 2011, and under 35 U.S.C. §119(e) on U.S. Provisional Application No. 61/433,884 filed on Jan. 18, 2011, the entire contents of each of which are hereby incorporated by reference in their entirety.

FIELD OF INVENTION

The invention relates to a method and arrangement for feeding heat-sensitive materials, particularly a heat-sensitive feedstock, to fixed-bed reactors comprising recycle whereby the residence time of the heat-sensitive material is decreased.

BACKGROUND

Several feed materials are more or less sensitive to heating and they undergo readily undesired reactions at elevated temperatures when feeding and processing of said feeds.

Heat-induced thermal side-reactions occurring particularly before the feed is brought into contact with an active catalyst bed can yield side-reaction products, such as polymeric substances, which may form fine particles and larger agglomerates causing fouling of the reactor and pipes and eventually plugging of the active catalyst bed.

Examples of heat-sensitive feeds are feedstocks comprising fatty acids and/or derivatives thereof like palm oil, soybean oil, rapeseed oil and sunflower oil, as well as fats and oils originating from animals and fish. Said starting materials may be used for example in hydrotreating reactions. When a feedstock comprising fatty acids and/or derivatives thereof enters a hydrotreating reactor at elevated temperatures and it is brought into contact with a hydrotreating catalyst bed for effecting hydrotreating reaction to obtain paraffinic hydrocarbons, adverse thermal side-reactions may occur. Examples of such thermal side-reactions include polymerization of double bonds in the fatty acid chains, which is dramatically increased with increased temperature. In said polymerization two fatty acid molecules, which may originate from triglycerides, are coupled together at the double bonds of the molecules and the double bond of the formed molecule is shifted to another position. In the case of conjugated double bonds further polymerization is even more likely to occur.

Free fatty acids may undergo similar dimerization, oligomerization and polymerization reactions. Fatty acids of plant origin typically contain several double bonds, like the polyunsaturated fatty acids (PUFA) of soybean oil. Conjugated double bonds of PUFA undergo readily polymerization reactions and they are therefore very sensitive for excess heating.

Hydrotreating of fatty acids and derivatives of fatty acids is typically carried out by hydrodeoxygenating/hydrogenating at an elevated temperature on a catalyst bed containing a solid metal catalyst. The reactor is usually equipped with a recycling line in order to recycle a part of the formed hydrotreated product back to the reactor feed. In the hydrodeoxygenation and/or hydrogenation of fatty acids and/or derivatives thereof the reaction temperature must typically be raised gradually with ageing of the catalyst, which in turn increases the adverse side-reactions. Heavier molecules formed in the side-reactions significantly decrease the quality of the hydrotreated product and also lead to problems if the hydrotreated product is subsequently subjected to an isomerization reaction step.

For effecting the desired conversion in the hydrotreatment process the temperature of the feed must be raised to the level required by the hydrodeoxygenation and hydrogenation reactions prior to feeding it to the reactor and to the active catalyst bed. Typically residence times in these hydrotreatment processes are around 1 min.

In practice, the temperature of the feed has been adjusted to the desired range by mixing a fresh feed with hot product recycle before introducing the mixture to the reactor. At the same time the fresh feed is diluted when it comes into contact with the product recycle. This dilution recycling facilitates an economical way of elevating the process temperature and adjusting the concentration of the substances contained in the feedstock to a suitable level in the feed.

Publication US20070010682 describes a method for the manufacture of diesel range hydrocarbons wherein a feedstock comprising triglycerides and/or fatty acids is hydrotreated and isomerized and the fresh feed is diluted with a recycled hydrotreated product stream.

A process for continuous hydrogenation of triglyceride containing raw materials in a fixed bed reactor system having several catalyst beds arranged in series is disclosed in EP 2226375. A vegetable oil raw material feed, hydrogen containing gas and diluting agent are passed to each catalyst bed. The weight ratio of the diluting agent to the raw material feed at the entrance of each catalyst bed should be essentially the same at the entrance of all catalyst beds and should not exceed 4:1. This process provides low downstream hydraulic load and allows the use of existing units without considerable revamp.

Therefore it is the object of the present invention to provide a method and arrangement for feeding heat-sensitive materials to fixed-bed reactors comprising recycling whereby the residence time of the heat-sensitive material and adverse side-reactions can be substantially decreased.

Definitions

Here residence time means the average amount of time that the heat-sensitive material or feedstock spends at elevated temperature before entering the catalyst bed.

The fresh feed is to be understood comprising the heat-sensitive feedstock.

The liquid feed is to be understood comprising the fresh feed and optionally at least one diluting agent, said liquid feed being in liquid form.

A conventional distributor is to be understood as a feed distributor used typically in industrial applications with longer residence times. A conventional distributor is used for distributing a liquid feed evenly in a reactor.

A cold feed distributor is to be understood as a feed distributor which is arranged on top of a catalyst bed. This means that the cold feed distributor is arranged as close as technically possible on the catalyst bed or partly embedded in the catalyst bed. The cold feed distributor is a short residence time distributor.

Here hydrotreatment is to be understood as a catalytic process, which removes oxygen from organic oxygen compounds as water (hydrodeoxygenation, HDO), sulphur from organic sulphur compounds as dihydrogen sulphide ($H_2S$) (hydrodesulphurisation, HDS), nitrogen from organic nitrogen compounds as ammonia ($NH_3$) (hydrodenitrogenation, HDN) and halogens, such as chloride from organic chloride compounds as hydrochloric acid (HCl) (hydrodechlorination, HDCl), typically under the influence of a sulphided NiMo or sulphided CoMo catalysts.

Here hydrodeoxygenation (HDO) is to be understood to mean the removal of carboxyl oxygen as water by the means of molecular hydrogen under the influence of a catalyst from compounds like fatty acid derivatives or fatty acids.

Here hydrogenation means saturation of carbon-carbon double bonds by the means of molecular hydrogen under the influence of a catalyst.

Here n-paraffins mean normal alkanes or linear alkanes that do not contain side chains.

Here isoparaffins mean alkanes having one or more $C_1$-$C_9$, typically $C_1$-$C_2$ alkyl side chains, typically mono-, di-, tri- or tetramethylalkanes.

SUMMARY OF THE INVENTION

The invention is directed to a method and arrangement for feeding heat-sensitive materials, particularly heat-sensitive feedstocks to fixed-bed reactor systems comprising product recycle and at least one reaction zone having at least one catalyst bed and comprising a cold feed distributor arranged on top of each catalyst bed and a conventional distributor arranged above each cold feed distributor, and the heat-sensitive feedstock is introduced to the catalyst bed(s) using the cold feed distributor, as defined in claims 1 and 10. The sub-claims are directed to preferred embodiments of the invention, while details and advantages of the invention will become apparent from the following description.

The invention is based on the idea that the temperature of the heat-sensitive feedstock, when entering the reactor and before getting into contact with the active catalyst bed, is maintained at a lower level, typically at approximately a temperature which is too low for effecting any thermal reactions and yet sufficiently high for maintaining the feed in liquid form. Then a hot dilution stream comprising a hot recycle stream, or a hot reaction mixture coming from the conventional distributor above the cold feed distributor is mixed with the liquid feed when entering the active catalyst bed, whereby the liquid feed is rapidly heated to substantially the temperature required for effecting the desired reaction. This makes it possible to maintain the residence time of the heat-sensitive material as short as possible and side-reactions can be substantially decreased or in some cases even avoided.

Accordingly, in the method according to the invention for feeding heat-sensitive materials a dilution stream comprising at least part of a product recycle is introduced to a fixed-bed reactor system comprising at least one fixed-bed reactor comprising at least one reaction zone having at least one catalyst bed and said reaction zone comprising a cold feed distributor arranged on top of each catalyst bed and a conventional distributor arranged above each cold feed distributor, and means for product recycle, said dilution stream being introduced at the top of the fixed-bed reactor to the conventional distributor, and a liquid feed comprising the heat-sensitive feedstock is introduced to the fixed-bed reactor to each reaction zone using the cold feed distributor(s). The dilution stream comprising at least part of the product recycle, or reaction mixture obtained from an upper catalyst bed in the case the reactor system contains more than one catalyst beds, is passed from the conventional distributor on the cold feed distributor below the conventional distributor and the liquid feed is rapidly mixed with the hot product recycle or hot reaction mixture and heated substantially to the desired reaction temperature and simultaneously passed to the active catalyst bed where the desired reaction is carried out.

The arrangement according to the invention for feeding heat-sensitive materials to fixed-bed reactor system comprises a fixed-bed reactor comprising at least one reaction zone having at least one catalyst bed and said reaction zone comprising a cold feed distributor arranged on top of each catalyst bed and a conventional distributor arranged above each cold feed distributor, and means for product recycle.

Contrary to conventional process arrangements where the feed and optional other components are introduced together or separately to a conventional distributor above the catalyst bed whereby the feed and other components are heated already in the preceding equipment e.g. piping and the distributor, in the method and arrangement according to the present invention the residence time and thermal side-reactions are decreased significantly when two separate distributors are utilized, providing very short residence time for the heat-sensitive feedstock and rapid mixing of separate streams having different temperatures.

The invention is further outlined in the detailed description of the invention using references to the attached FIGS. 1-4.

FIG. 1 presents the process scheme for one embodiment of the invention (hydrotreating of renewable material), wherein the heat-sensitive feedstock is fed to a hydrotreatment reactor comprising in series three reaction zones, each zone containing one catalyst bed.

FIG. 2 presents a detail of FIG. 1.

FIG. 3 shows a cold feed distributor.

FIG. 4 presents a side-view of an operating cold feed distributor.

FIG. 1 shows a hydrotreating reactor (12), which in this instance comprises three reaction zones (13C), (13B) and (13A), of which each contains a hydrotreating catalyst arranged to a catalyst bed. A liquid feed comprising a feedstock comprising renewable starting materials, typically vegetable oil, is fed at temperature T1 through line (10) to feed inlet lines, ($f_1$), ($f_2$) and ($f_3$), where a part of the product recycle (hydrotreated product), recycled as dilution through the recycling line (16) and a heat exchanger (15), is combined with the liquid feed. The diluted and heated liquid feed is fed at temperature T2 to the hydrotreating reactor (12) at feed inlets $F_1$, $F_2$ and $F_3$ to the three reaction zones (13C), (13B) and (13A) using cold feed distributors. The reactor (12) comprises conventional distributors (not shown in the Figure) above each cold feed distributor. (Detail A of reaction zone 13C where cold feed distributor (21) is shown is illustrated in FIG. 2). At least part of the product recycle in line (16), optionally comprising the diluted and heated liquid feed is fed at temperature T2 to the hydrotreating reactor (12) at inlet $F_4$ using a conventional distributor (not shown in the figure). The temperature of the recycling line (16) is set with the help of a heat exchanger (15). With the dilution stream of recycling line (16) the liquid feed (10) is effectively diluted and heated. Hydrogen ($H_2$) containing gas (17) is fed to the recycling line (16) and the hydrogen containing dilution stream (11) is fed to the hydrotreating reactor (12) at temperature T2 and introduced to the reactor at feed inlet $F_4$. Optionally a part of the liquid feed (10) may be introduced to the hydrogen containing dilution stream (11). Similarly the hydrogen feed (17) can be arranged to be introduced to the reactor together with the feed inlets $F_1$, $F_2$ and $F_3$. (Not shown in the figure.) The hydrotreated product is withdrawn using line (14) at the temperature T3.

According to the FIG. 1 at least a significant portion or preferably all liquid feed is fed to the hydrotreating reactor directly to the hydrotreatment reaction zones through the feed inlets $F_1$, $F_2$ and $F_3$ on the side of the reactor (12) and to the catalyst beds using the cold feed distributors.

Figure 1:
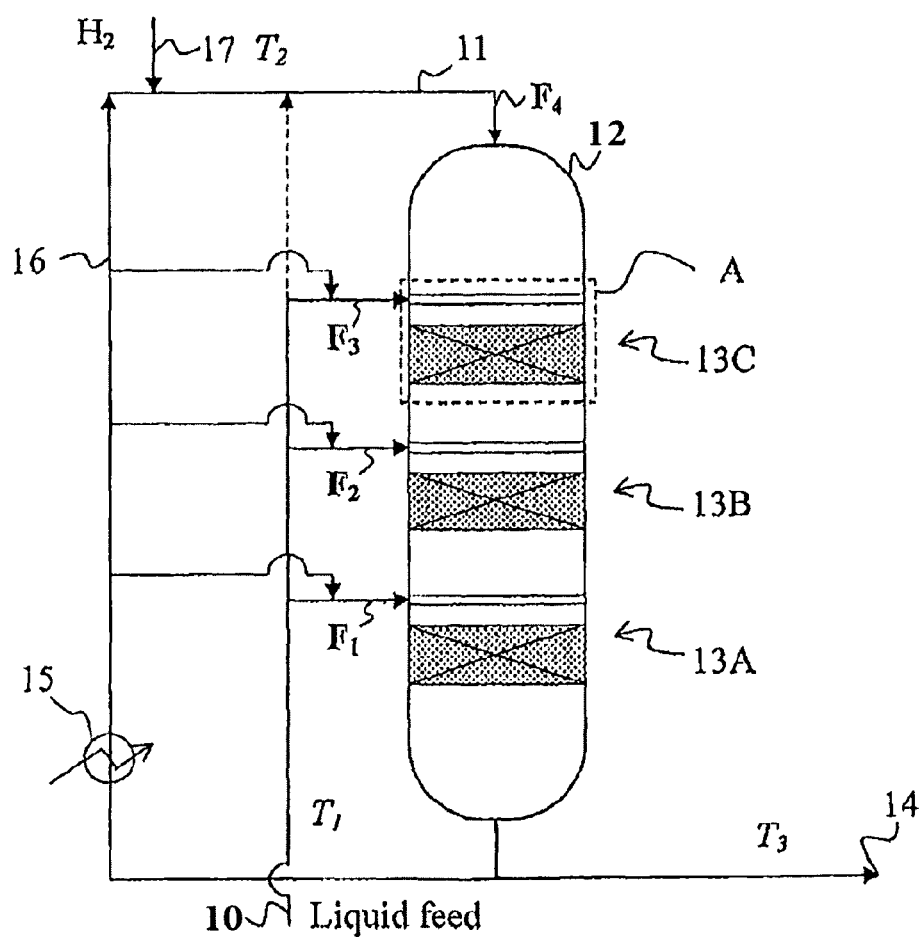
Figure 2:
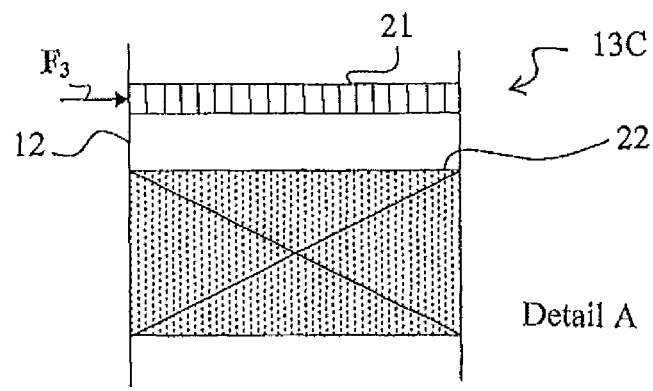
FIG. 2 shows detail A of FIG. 1, describing in reactor (12) a hydrotreatment zone (13C) to which a liquid feed is introduced into the catalyst bed (22) with a feed inlet F₃ using a cold feed distributor (21) arranged on top of the catalyst bed (22).

The ring distributor (21) comprises a sufficient amount of, at least two and typically 6 distributor units (23) that are interconnected with each other with a pipe arrangement (24). Suitable said pipe arrangement is a feed ring/pipe. Said distributor units (23) comprise a space (26) limited with a wall (27). Said distributor units (23) are located on a circle (28) and preferably at least one of the distributor units (23) is located in the middle of the circle (28). Said distributor units (23) are located essentially in the same cross-section. Said ring distributor (21) further comprises at least one means (29) for feeding the liquid feed to the distributor units (23), said means being interconnected with said pipe arrangement (24) and a connection (30). Said distributor units (23) are advantageously manufactured from screen type plate that provides maximal flow area combined with even and stable flow to each direction. Said distributor units have preferably a ring-shaped structure, which enables simultaneous flow coming from above also through their openings. The parts of the distributor may be sufficiently connected to each other e.g. with flanged connections (not shown) so that that they are easily dismantled and removed if needed.

If needed the distributor units can be filled e.g. with active grading catalyst or be fully located within such layer to control the possible impurities in the flow to be distributed.

Figure 4:
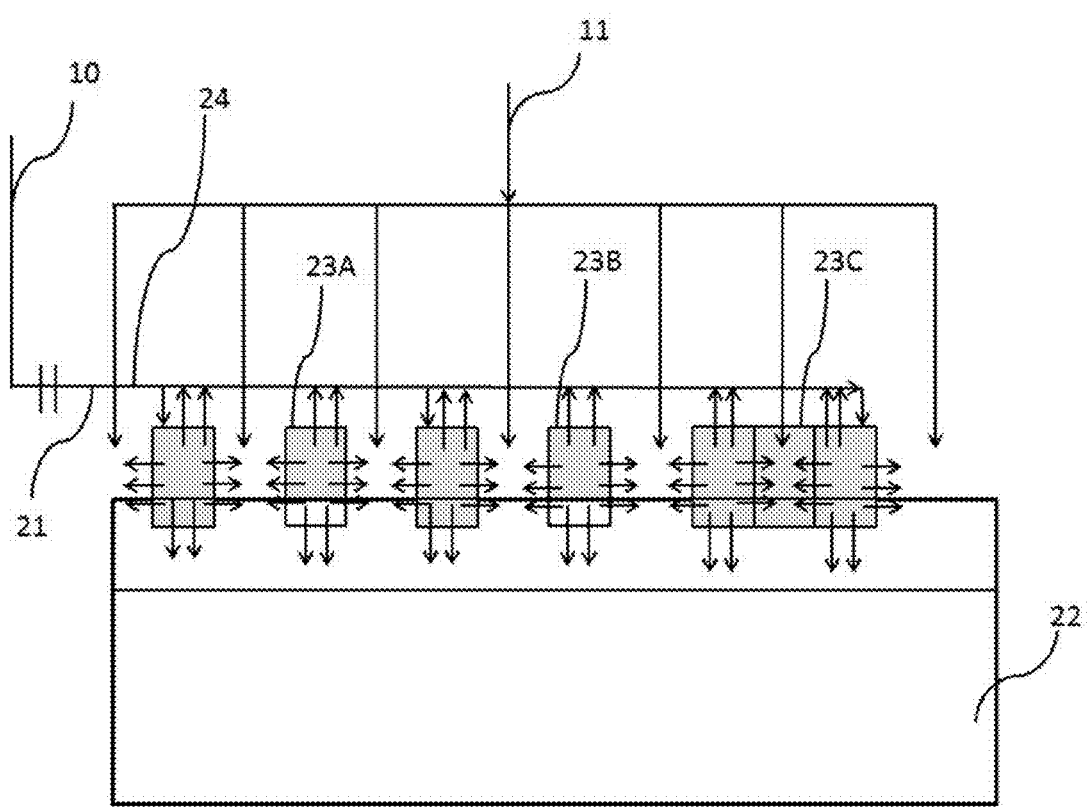

FIG. 4 shows as side-view the operation of the cold feed distributor (21). The liquid feed (10) optionally comprising product recycled is fed to the ring distributor (21) and divided using pipe arrangement (24) to each distributor unit (23A), (23B) and (23C), and from the distributor units to the surrounding reactor space and catalyst bed, a stream (11) containing hydrogen and the diluting stream or reaction mixture from the previous catalyst bed is passed from a conventional distributor (not shown in the Figure) above the cold feed distributor (21) and to the catalyst bed (22).

DETAIL DESCRIPTION OF THE INVENTION

It was surprisingly found that when feeding a heat-sensitive feedstock to a fixed-bed reactor system undesired thermal side-reactions occurring in the reactor before the heat-sensitive feedstock is allowed to get into contact with the active catalyst bed can be completely avoided or their extent can at least be significantly decreased to an acceptable level by using the method and arrangement according to the invention wherein the residence time is decreased significantly.

The method according to the invention for feeding heat-sensitive feedstocks to a fixed-bed reactor system comprises the steps where a dilution stream comprising at least part of a product recycle is introduced to a fixed-bed reactor system comprising at least one fixed-bed reactor comprising at least one reaction zone having at least one catalyst bed and said reaction zone comprising a cold feed distributor arranged on top of each catalyst bed and a conventional distributor arranged above each cold feed distributor, and means for product recycle, said dilution stream being introduced at the top of the fixed-bed reactor to the conventional distributor, and a liquid feed comprising the heat-sensitive feedstock is introduced to the fixed-bed reactor to each reaction zone using the cold feed distributor(s). The temperature of said liquid feed is high enough to allow suitable transport of it to the reactor system, i.e. the viscosity of the feed material must be appropriate, but simultaneously the temperature is as low as possible to avoid side-reactions. During start-up any suitable hydrocarbon can be used as the product recycle until the actual product recycle is available. The dilution stream comprising at least part of the product recycle, or a reaction mixture obtained as effluent from an upper reaction zone (and catalyst bed) in the case the reactor system contains more than one reaction zones, is passed from the conventional distributor on the cold feed distributor whereby the liquid feed is rapidly mixed with the product recycle or reaction mixture and thus heated substantially to the desired reaction temperature and simultaneously passed to the active catalyst bed where the reaction is realized.

In the case the fixed-bed reactor comprises more than one reaction zones the reaction zones are preferably in series.

The arrangement according to the invention for feeding heat-sensitive feedstocks to a fixed-bed reactor system comprises a fixed-bed reactor comprising at least one reaction zone, suitably three reaction zones and each zones having at least one catalyst bed and each of the reaction zones comprising a cold feed distributor arranged on top of each catalyst bed and a conventional distributor arranged above each cold feed distributor, and means for product recycle.

Said fixed-bed reactor system further comprises means for feeding the dilution stream (product recycle), optionally means for feeding gaseous component(s) and optionally means for feeding part of the liquid feed to the dilution stream to the feed inlet at the top of the fixed-bed reactor, optional means for feeding gaseous component(s) to one or more liquid feed inlets on the side of the fixed-bed reactor, means (preferably a recycle line) for recycling the reactor product to one or more feed inlets to each reaction zone to each catalyst bed, means for feeding liquid feed to one or more feed inlets, preferably to feed inlets on the side of the fixed-bed reactor to the cold feed distributors and at least one heat exchanging device in the recycle line for setting the temperature of the recycle product.

Figure 3:
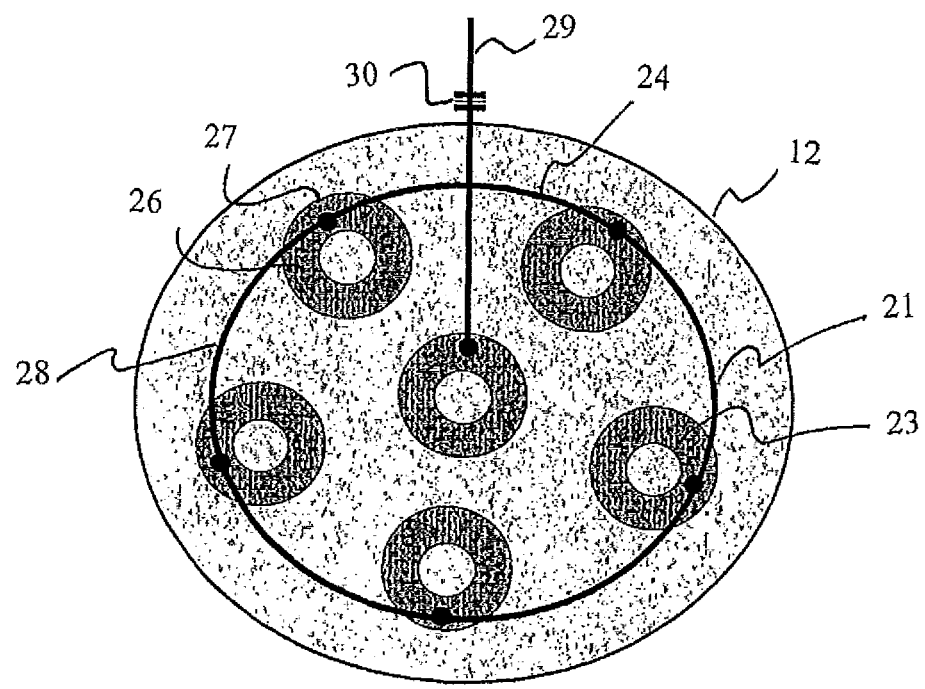
FIG. 3 shows in detail a cross-section of a suitable cold feed distributor (21) and in this particular embodiment a ring distributor, to be installed in a reactor (12).

The cold feed distributor may be any feed distributor which can be arranged on top of a catalyst bed. This means that the cold feed distributor is arranged as close as technically possible on the catalyst bed or partly embedded in the catalyst bed. The cold feed distributor is a short residence time distributor which provides immediate and even distribution of the feed. A ring distributor as described in FIG. 3 is an example of a suitable cold feed distributor.

The conventional distributor may be any distributor known in the art which provides longer residence times. Examples of suitable conventional distributors are bubble cap trays, nozzle trays and the like.

A cold feed distributor is used for introducing the liquid feed to a reaction zone and directly to an active catalyst bed, particularly for ensuring simultaneously 1) even and rapid mixing of dilution stream or reaction mixture with the liquid feed and 2) for ensuring even and rapid distribution and entering of the liquid feed into the catalyst bed(s).

The ring distributor, which is an example of a suitable cold feed distributor, comprises a sufficient amount, suitably at least two, preferably at least six distributor units interconnected with each other with a pipe arrangement, such as a feed ring/pipe, and at least one means for introducing the liquid feed into the distributor units, such as a feed pipe connected to the said pipe arrangement. The distribufor units are located essentially in the same cross-section. The distributor units are advantageously manufactured from material comprising holes or openings, such as screen type plate, that allows and provides maximal flow area combined with even and stable flow to each direction. The distributor unit comprises a space limited by a wall and preferably said units have a ring-shaped structure, which enables simultaneous flow coming from above also through their openings. This arrangement minimizes the vertical flow obstacle and provides optimal mixing. Particularly the over-all flow profile is stabilized and very fast below the units.

In the case gaseous component(s) such as hydrogen is used in the process, e.g. in hydrotreatment, said gaseous component(s) or part of it and at least part of the dilution stream are introduced at the top of the fixed-bed reactor system. Optionally said gaseous component(s) may also be introduced to one or more reaction zone(s) together with the liquid feed comprising the heat-sensitive feedstock using the cold feed distributors. Hydrogen refers here to hydrogen or any gas containing hydrogen.

Liquid feed comprising the heat-sensitive feedstock is introduced to the fixed-bed reactor to each reaction zone and to the active catalyst bed using the cold feed distributor(s) arranged on the top of each catalyst bed.

Said liquid feed has a temperature typically of at least ambient temperature (20-250° C.), suitably from at least 60° C. to 240° C.

Said liquid feed comprising the heat-sensitive feedstock may comprise optional diluents, optionally part of the hot dilution stream and optionally gaseous component(s). The optional diluents may comprise any inert diluents suitably used in the intended reaction, such as hydrocarbons and the like.

The liquid feed, which comprises the heat-sensitive feedstock, optional diluents, optionally part of the hot dilution stream and optionally gaseous component(s), is introduced to each catalyst bed using the cold feed distributors. The dilution stream introduced to the reactor at the top of it and comprising at least part of a product recycle, or a reaction mixture obtained as effluent from an upper catalyst bed, both obtained/flowing from a conventional distributor arranged above the cold feed distributor is mixed with the liquid feed, which is rapidly heated whereby the temperature of the liquid feed is raised to the level required for effecting the reaction and simultaneously passed to the active catalyst bed. This reduces the residence time significantly. The heat-sensitive feed is maintained at this higher temperature for a very short time before the actual reaction occurs and thus essentially no or almost no adverse thermal side-reactions can occur. The residence time is less than 10 s, preferably 2-5 s and more preferably 1-2 s.

The temperature of the liquid feed, before entering the cold feed distributor and getting in contact with the active catalyst bed, depends on the nature of the feedstock. Suitably it is selected to be close to the temperature required in the reaction zone but lower than a temperature in which adverse side-reactions will occur.

Before entering the reactor, the liquid feed is preferably heated with the dilution stream comprising the product recycle by mixing the liquid feed with the dilution stream having a temperature of 50-340° C. higher than the temperature of the liquid feed, to achieve the desired temperature, preferably between 60 and 240° C., particularly preferably between 150 and 220° C., whereby the dilution stream comprising the product recycle acts as a diluent and heats the liquid feed. Preferably a dilution stream having a temperature between 280 and 450° C., preferably between 300 and 350° C. is used.

According to a preferred embodiment of the invention the liquid feed is diluted and heated in at least one step, preferably in two to five steps, particularly preferably in two steps. The proportion of the dilution in the steps may vary in a ratio from 10:100 to 5000:100 (diluent:fresh feed). Preferably the feed is diluted in the first step with a diluent in a ratio from 0.1:1 to 5:1 (diluent:fresh feed) per weight. In the second step the liquid feed is then diluted with a diluent from 0.1:1 to 50:1 (diluent:fresh feed) per weight.

As one embodiment of the invention, a method for feeding heat-sensitive feedstock comprising fatty acids and/or derivatives thereof to a hydrotreating reactor system for producing paraffinic hydrocarbons (n-paraffins) from renewable sources is presented in the following. The obtained hydrocarbons can be used as a hydrocarbon fuel or they can be converted into hydrocarbon fuels, for example by a further isomerization step resulting in iso-paraffins. Said method involves treating the feedstock with hydrogen in the presence of a catalyst whereby fatty acids and/or derivatives thereof are hydrodeoxygenated and/hydrogenated to form hydrocarbons.

Said method for feeding heat-sensitive feedstock to a fixed-bed reactor system comprises the steps, where
a) a dilution stream comprising at least part of a product recycle and hydrogen and having a temperature between 280 and 450° C., preferably between 300 and 350° C. is introduced to a fixed-bed hydrotreating reactor system comprising at least one fixed-bed hydrotreating reactor comprising at least one reaction zone having at least one hydrotreating catalyst bed and said reaction zone comprising a cold feed distributor arranged on top of each catalyst bed and a conventional distributor arranged above each cold feed distributor, and means for product recycle, said dilution stream being introduced at the top of the fixed-bed reactor to the conventional distributor, and a liquid feed comprising the heat-sensitive feedstock is introduced to the fixed-bed reactor, and
b) a liquid feed having a temperature between 60 and 240° C., preferably between 150 and 220° C. and comprising fatty acids and/or derivatives thereof and optional diluents is introduced to the fixed-bed reactor to each reaction zone using the cold feed distributor(s), whereby the liquid feed is mixed with the dilution stream or reaction mixture and heated to 250-350° C., preferably 280-320° C. and passed to the catalyst bed where the hydrodeoxygenation and/or hydrogenation reaction is effected in the presence of hydrogen.

Then the liquid hydrotreated product is separated.

In the hydrotreating reaction known hydrogenation catalysts containing metals from Group VIII and/or VIB of the Periodic System may be used. Preferably, the hydrogenation catalysts are supported Pd, Pt, Ni, NiMo or a CoMo catalysts, the support being alumina and/or silica. The pressure may be varied between 2 and 15 MPa, and LHSV may range from 0.1 to 10 h$^{-1}$ and H$_2$ feed from 50 to 2000 l/l.

When the liquid feed is introduced to each hydrotreating catalyst bed using the cold feed distributors arranged on top of each catalyst bed, the feed is rapidly heated to the temperature required for effecting the hydrotreatment reactions to happen in the presence of hydrogen. The duration of this heating step is so short that substantially no adverse thermal side-reactions can occur before the feedstock is hydrotreated.

The feedstock is maintained at the hydrotreating temperature of 250-350° C. only for a very short time before the actual hydrotreatment reactions start and thus essentially no adverse thermal reactions can occur. The residence time is less than 10 s, preferably 2-5 s and more preferably 1-2 s.

The heat-sensitive feedstock comprising fatty acids and/or derivatives thereof is heated if necessary, to a temperature typically of at least ambient temperature (20° C. or higher) required to obtain a liquid feed, i.e. in a form where it can be pumped. This temperature is highly dependent of the chemical composition of the feedstock. The liquid feed may optionally be diluted with diluents such as hydrocarbons if desired. The diluents may be recycled hydroteated products, recycled hydrotreated and isomerized products or a fresh hydrocarbon stream of any origin or any combination thereof. Suitably diesel range hydrocarbon fractions may be used as diluents.

The hydrogenation and hydrodeoxygenation of fatty acid substances to n-paraffins is a highly exothermic reaction. The heat thus produced can be used for heating the liquid feed by recycling the hydrotreated product to liquid feed.

Said feedstock may comprise bio oil and/or fat originating from renewable sources, such as fats and oils from plants and/or animals and/or fish and compounds derived from them. Suitable bio oils are plant and vegetable oils and fats, animal fats, fish oils, and any mixtures thereof containing fatty acids and/or fatty acid esters. Examples of said materials are wood-based and other plant-based and vegetable-based fats and oils such as rapeseed oil, colza oil, canola oil, tall oil, sunflower oil, soybean oil, hempseed oil, olive oil, linseed oil, mustard oil, palm oil, peanut oil, castor oil, coconut oil, as well as fats contained in plants bred by means of gene manipulation, animal-based fats such as lard, tallow, train oil, and fats contained in milk, as well as recycled fats of the food industry and mixtures of the above. In some cases the feedstock, such as crude plant or animal fat, contains high impurity content and thus the feedstock is preferably purified using suitable pretreatment steps before introducing it to the hydrotreating step.

Typically a bio oil or fat comprised in the feedstock comprises $C_{12}$-$C_{24}$ fatty acids, derivatives thereof such as anhydrides or esters of fatty acids as well as triglycerides of fatty acids or combinations of thereof. The fatty acids or fatty acid derivatives, such as esters may be produced via hydrolysis of bio oils or by their fractionalization or transesterification reactions of triglycerides. The basic structural unit of a typical plant or vegetable or animal oil/fat useful as the feedstock is a triglyceride.

The invention provides several significant advantages over the state of the art. In the method according to the invention the formation of heat-induced side-reaction products before contacting the feed with the active catalyst bed can be avoided or at least significantly decreased. The feed having a lower temperature is passed very rapidly to the active catalyst bed and simultaneously when entering the catalyst bed it is heated to the actual reaction temperature whereby the desired reactions start to occur. This decreases the residence times to a significant extent.

The temperatures and the proportions of the product recycle can be optimised within the scope of the invention. A person skilled in the art is capable of optimising the temperatures and amounts of the dilution stream in the liquid feed and the dilution stream at the top of the reactor to achieve the temperatures of the invention.

The effect of residence time is illustrated in the following example.

EXAMPLE

Thermal stability of purified rapeseed oil (RSO) was tested. Purified rapeseed oil was heated in a container to either 200° C. or 300° C. RSO was maintained at the final temperature for a specified time and the formation of oligomerization/polymerization products was studied. Samples of heated RSO were taken at 0 h when maximum temperature was reached, at 5 h, 22 h and finally when RSO again reached ambient temperature (25° C.) after cooling. The amount of triglycerides and oligomerisation/polymerization products was analysed using gel permeation chromatography.

Table 1 below shows that almost no oligomerisation/polymerization occurred when RSO was heated from 25 to 200° C. Even, after 22 h at 200° C. virtually no oligomerisation/polymerization was observed. When RSO was heated to 300° C. the oligomerisation/polymerization started immediately and after 5 hours at 300° C. already 16% of the feedstock was oligomerised/polymerized. In the case RSO was maintained for a longer period of at a temperature of 300° C., more oligomerisation/polymerization occurred. The results of the tests are provided in following Table 1.

TABLE 1

| | Temperature (° C.) | Residence time (hours) | RSO glycerides (%) | Oligomerisation products (%) |
|---|---|---|---|---|
| Purified rapeseed oil | 25 | 0 | 99 | 0.3 |
| Stability test 200° C. | 25 → 200 | 1 | 98 | 1 |
| | 200 | 5 | 97 | 2 |
| | 200 | 22 | 97 | 2 |
| | 200 → 25 | 25 | 97 | 2 |
| | 25 → 300 | 1 | 95 | 3 |
| | 300 | 5 | 78 | 16 |

The invention claimed is:

1. A method for feeding heat-sensitive feedstock to a fixed-bed reactor system,
   wherein said fixed-bed reactor system comprises means for product recycle and a fixed bed reactor comprising more than one reaction zone,
   wherein each of the more than one reaction zone comprises at least one catalyst bed, and
   wherein a cold feed distributor is arranged on top of each catalyst bed and a conventional distributor is arranged above each cold feed distributor,
   said process comprising introducing a liquid feed comprising the heat-sensitive feedstock into the fixed-bed reactor system to each reaction zone with the cold feed distributor, and
   introducing a dilution stream comprising at least part of a product recycle into the fixed-bed reactor system at the top of the fixed-bed reactor and to each reaction zone with the conventional distributor,
   wherein the heat-sensitive feedstock is at least one feedstock selected from the group consisting of a fatty acid, a derivative thereof, and a bio oil.

2. The method according to claim 1, wherein a temperature of the liquid feed is from 20 to 250° C.

3. The method according to claim 1, wherein the liquid feed is mixed with said dilution stream having a temperature of 50-340° C. higher than a temperature of the liquid feed, before introducing to each reaction zone.

4. The method according to claim 1, wherein a temperature of said dilution stream is between 280 and 450° C.

5. The method according to claim 1, wherein at least one gaseous component is introduced to said dilution stream and then to the top of the fixed-bed reactor, wherein the gaseous component is hydrogen or a gas containing hydrogen.

6. The method according to claim 1, wherein at least one gaseous component is introduced to at least one reaction zone together with the liquid feed, wherein the gaseous component is hydrogen or a gas containing hydrogen.

7. The method according to claim 2, wherein said temperature of the liquid feed is from 60 to 240° C.

8. A method for feeding heat-sensitive feedstock to a fixed-bed reactor system,
wherein said fixed-bed reactor system comprises means for product recycle and a fixed bed reactor comprising more than one reaction zone,
wherein each of the more than one reaction zone comprises at least two catalyst beds, and
wherein a cold feed distributor is arranged on top of each of said at least two catalyst beds and a conventional distributor is arranged above each cold feed distributor,
said process comprising introducing a liquid feed comprising the heat-sensitive feedstock into the fixed-bed reactor system to each reaction zone with the cold feed distributor, and
introducing a dilution stream comprising at least part of a product recycle into the fixed-bed reactor system at the top of the fixed-bed reactor and to each reaction zone with the conventional distributor,
wherein the heat-sensitive feedstock is at least one feedstock selected from the group consisting of a fatty acid, a derivative thereof, and a bio oil.

9. The method according to claim 8, wherein a temperature of the liquid feed is from 20 to 250° C.

10. The method according to claim 9, wherein a temperature of said dilution stream is between 280 and 450° C.

11. The method according to claim 10, wherein at least one gaseous component is introduced to said dilution stream and then to the top of the fixed-bed reactor, wherein the gaseous component is hydrogen or a gas containing hydrogen.

12. The method according to claim 1, wherein the heat-sensitive feedstock is at least one component selected from the group consisting of a $C_{12}$-$C_{24}$ fatty acid and a derivative thereof.

13. The method according to claim 12, wherein the derivative of the fatty acid is at least one component selected from the group consisting of an anhydride, an ester, and a triglyceride.

14. The method according to claim 1, wherein the bio oil is at least one component selected from the group consisting of a plant oil, an animal oil, a fish oil, a compound derived therefrom, and mixtures thereof.

15. The method according to claim 8, wherein the heat-sensitive feedstock is at least one component selected from the group consisting of a $C_{12}$-$C_{24}$ fatty acid and a derivative thereof.

16. The method according to claim 15, wherein the derivative of the fatty acid is at least one component selected from the group consisting of an anhydride, an ester, and a triglyceride.

17. The method according to claim 8, wherein the bio oil is at least one component selected from the group consisting of a plant oil, an animal oil, a fish oil, a compound derived therefrom, and mixtures thereof.

* * * * *